July 20, 1948. W. C. NABORS 2,445,686
TANDEM AXLE ASSEMBLY
Filed April 6, 1946 3 Sheets-Sheet 1

Inventor
William C. Nabors
By
E. V. Hardway
Attorney

July 20, 1948.   W. C. NABORS   2,445,686
TANDEM AXLE ASSEMBLY
Filed April 6, 1946   3 Sheets-Sheet 2

Inventor
William C. Nabors
By E. V. Hardway
Attorney

July 20, 1948.   W. C. NABORS   2,445,686
TANDEM AXLE ASSEMBLY
Filed April 6, 1946   3 Sheets-Sheet 3
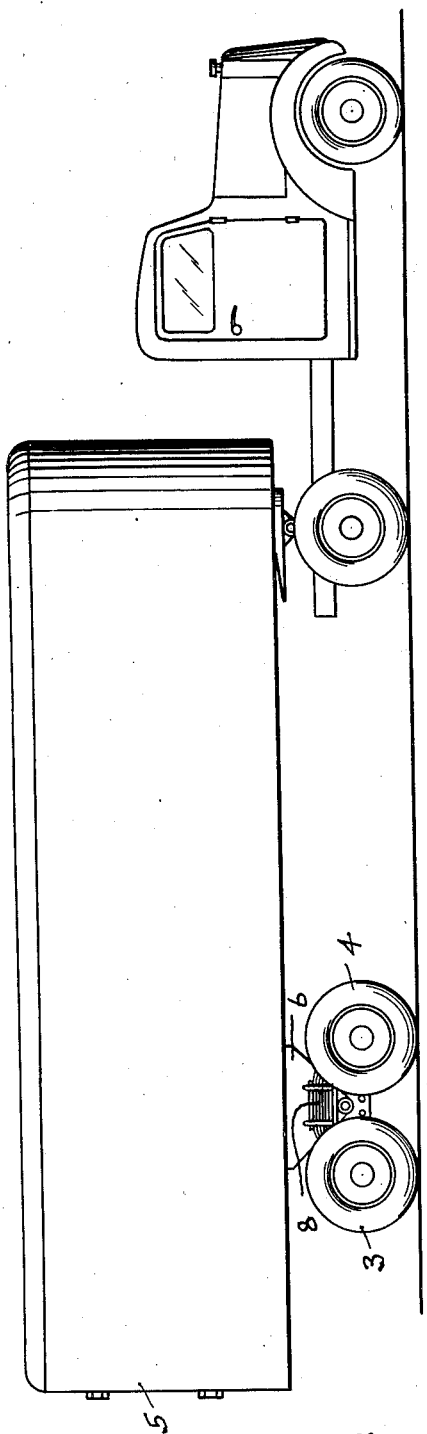
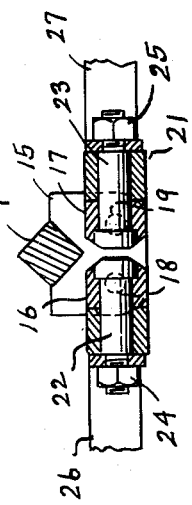
Fig. 4.
Fig. 5.
Inventor
William C. Nabors
By
E. V. Hardway.
Attorney Patented July 20, 1948

2,445,686

UNITED STATES PATENT OFFICE 2,445,686

TANDEM AXLE ASSEMBLY

William C. Nabors, Mansfield, La.

Application April 6, 1946, Serial No. 660,195

2 Claims. (Cl. 280—104.5)

This invention relates to a tandem axle assembly.

It is an object of the invention to provide an axle assembly for four wheeled trailers of such construction that the front and rear wheels will be kept in alignment with the direction of travel even though the turning radius will be absorbed by the tires or slippage.

Another object of the invention is to provide an assembly of the character described which, while retaining directional alignment of the wheels will allow each axle complete freedom of movement to permit the tires to follow the contour of the ground surface at all times.

It is a further object of the present invention to provide an assembly of the character described wherein the wheels may move vertically independent of each other. This allows the vehicle to move over uneven surfaces without subjecting the assembly to undue stress while at the same time maintaining the front and rear wheels in alignment with the direction of travel.

Other objects and advantages will be apparent from the following specification which is illustrated by the accompanying drawings wherein—

Figure 4 is a fragmentary, longitudinal, sectional view taken on the line 4—4 of Figure 1; and Figure 5 is a side elevation of the assembly as applied in use.

Figure 1:
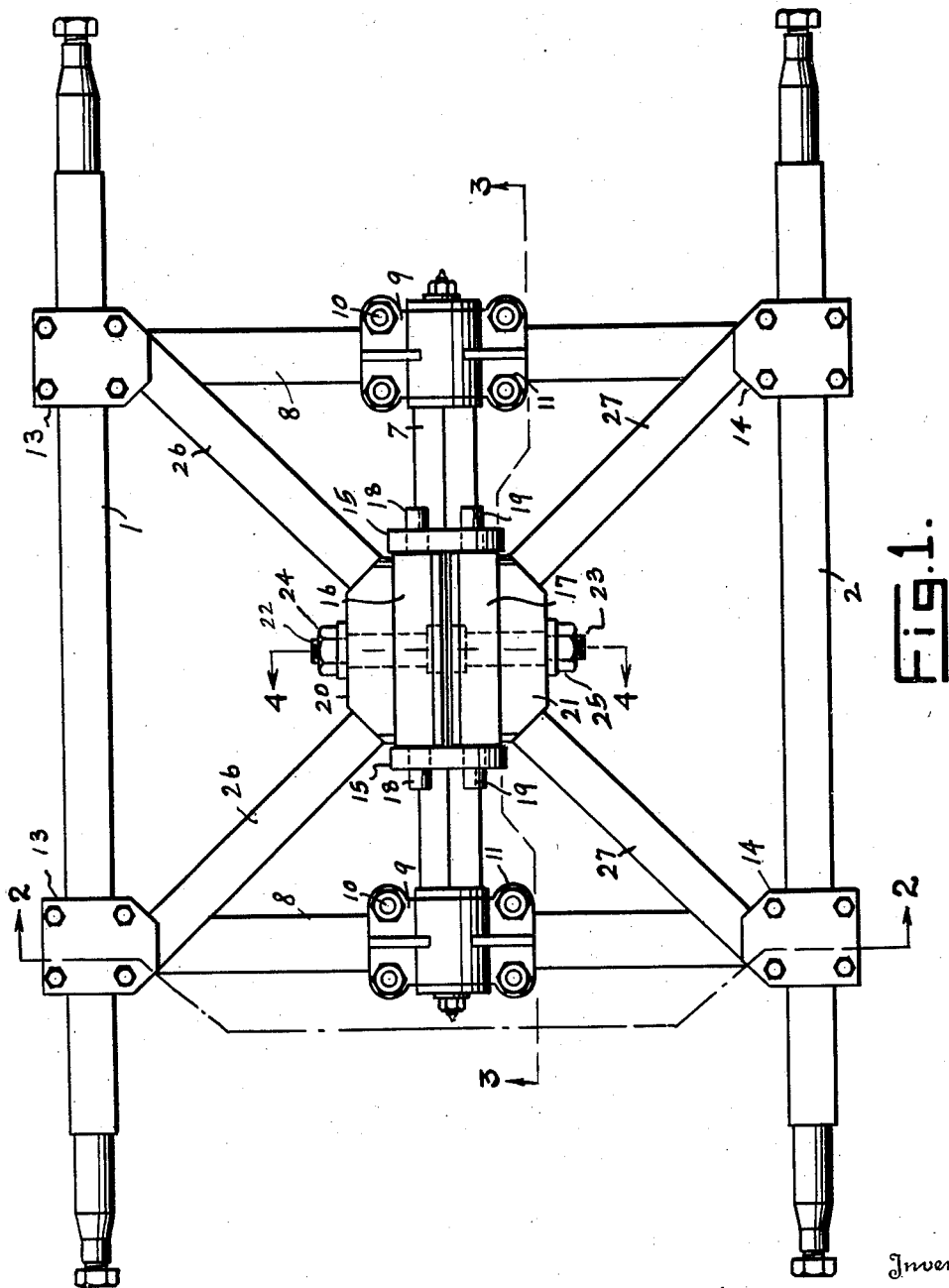
Figure 1 is a bottom plan view of the axle assembly.
Figure 2:
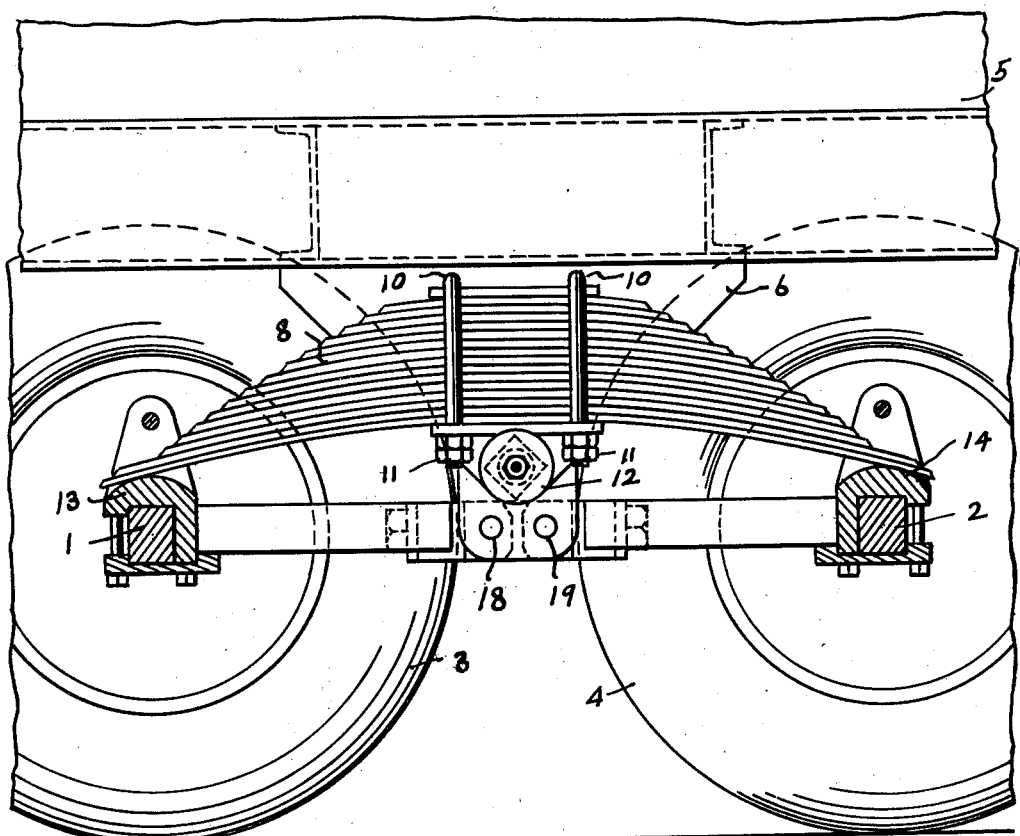
Figure 2 is a longitudinal, sectional view taken on the line 2—2 of Figure 1.
Figure 3:
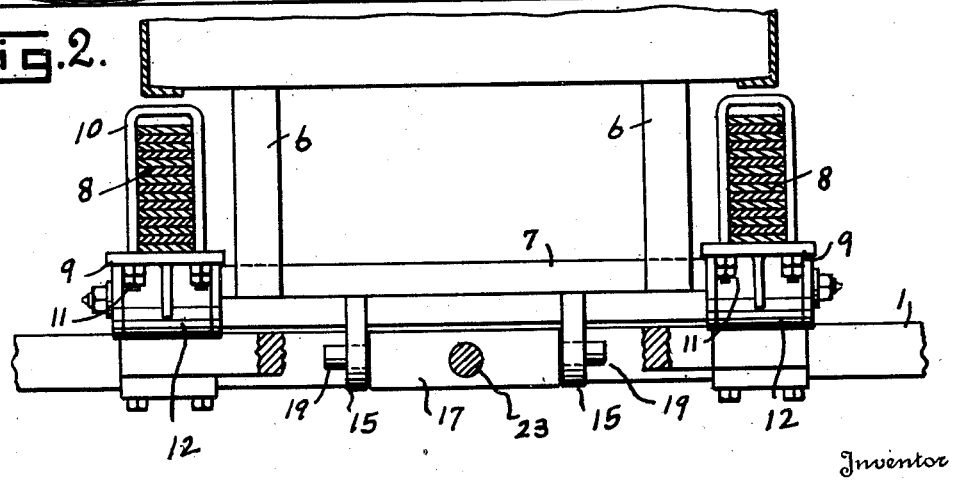
Figure 3 is a cross-sectional view taken on the line 3—3 of Figure 1.

Referring now more particularly to the drawings wherein like numerals of reference designate the same parts in each of the figures, the numerals 1 and 2 designate the rear and front axles, respectively, of a trailer on whose spindles the rear wheels 3, 3 and front wheels 4, 4 are mounted to rotate.

The numeral 5 designates a trailer body of any selected design. In the present illustration there are the side brackets 6, 6 depending from the trailer body and to the lower ends of which the transverse master axle 7 is welded or otherwise secured.

These axles 1, 2 and 7 are formed of metal bars which are shown as being square in cross-section.

In the present illustration there are two, upwardly bowed, leaf spring assemblies 8, 8 which are mounted on the saddles 9, 9 and the leaves of the respective assemblies are clamped in assembled relation by means of the inverted U-bolts 10, 10 which surround the respective spring assemblies and whose free ends extend through the saddle flanges and are secured thereto by the nuts 11. The saddles 9 are formed with transversely aligned bearings 12 and the ends of the master axle 7 are formed with spindles about which the saddles may turn.

The ends of the spring assemblies are supported on the front and rear spring perches, as 13, 13 and 14, 14 which are suitably secured to the front and rear axles 1 and 2.

Accordingly the body 5 and the master axle 7 will be yieldingly supported on the front and rear axles 1 and 2 by the side spring assemblies 8, 8 and as the front and rear wheels 3 and 4, on either side, assume different elevations due to irregularities of the ground surface the corresponding spring assembly may rotate about the master axle; and in this connection it is to be noted that the spring assembly on one side may rotate about the master axle independently of the rotation of the spring assembly on the other side. However, irrespective of the vertical movements of the wheels relative to each other the distribution of the load on each of the four wheels will be maintained substantially uniform.

Secured to the master axle 7, underneath, and spaced apart are the brackets 15, 15. These brackets are preferably welded to the master axle 7. Between said brackets are the oblong, rear and front blocks 16, 17 which are provided with end pintles 18, 18 and 19, 19 which rotate in suitable bearings in the brackets 15. Accordingly the blocks 16, 17 rotate on axes which are transverse with relation to the assembly.

Fitted against the rear and front sides, respectively, of the block 16, 17 are the rear and front yokes 20, 21. There are the rear and front pivot pins 22, 23 which are fitted centrally through the block 16, 17 as well as through central bearings in the yokes 20, 21. They have inner end heads which engage the inner sides of the corresponding blocks and have retaining nuts 24, 25 screwed onto their outer ends whereby the yokes are mounted to pivot, or rotate, on longitudinal axes.

There are the rear and front radius rods or bars 26, 26 and 27, 27. The outer ends of these bars are bolted in the spring perch assemblies 13, 13 and 14, 14, respectively, and they converge inwardly and their inner ends are secured, preferably by welding, to the respective yokes 20, 21.

Assuming that the wheels 3 and 4 are traveling over comparatively smooth roads upon downward movement of the body relative to the axle assemblies the spring will move toward a straight line position, the master axle 7 moving downwardly and the rear and front radius rod assemblies 26, 27 will also move downwardly pivoting about the axes of the pintles 18, 19. In passing over uneven road surfaces either the rear or front wheels may drop down into a depression whereupon the corresponding radius rods will pivot about the corresponding pintles 18, or 19, as the case may be; or, on the other hand one front, or rear, wheel may drop into a depression, or may strike an elevation, whereupon the corresponding radius rod assembly 26, or 27, as the case may be may, pivot about the corresponding pivot pin 22 or 23 on a longitudinal axis. It is, therefore, apparent that the wheels may follow uneven surfaces but the load will be distributed onto the respective wheels irrespective of the various positions the axle assembly may assume. At the same time the wheels will be maintained in alignment with the direction of travel irrespective of their elevation with respect to each other.

The drawings and description are illustrative merely while the broad principle of the invention will be defined by the appended claims.

What I claim is:

1. An assembly of the character described comprising, front and rear axles, ground wheels supporting the axles, spring perches secured to the front and rear axles and spaced apart, a load supporting master axle between, and substantially parallel with, said front and rear axles, side spring assemblies which are spaced apart and whose front and rear ends, respectively, rest on the corresponding spring perches, spring saddles having bearings to receive end spindles of the master axle, means for clamping said spring assemblies to the respective saddles, front and rear brackets secured to and depending from the master axle, blocks mounted to rotate on transverse axes between the front and rear brackets, front and rear yokes mounted to pivot on longitudinal axes on the respective blocks, front and rear radius bars fixed to the respective front and rear yokes and diverging therefrom and whose outer ends are immovably secured to the corresponding front and rear axles.

2. An assembly of the character described comprising, front and rear axles, spring perches secured to the front and rear axles and spaced apart, a load supporting master axle between, and substantially parallel with, said front and rear axles, side spring assemblies which are spaced apart and whose front and rear ends, respectively, rest on the corresponding spring perches, spring saddles having bearings to receive end spindles of the master axle, means for clamping said spring assemblies to the respective saddles, front and rear brackets secured to and depending from the master axle, blocks mounted to rotate on transverse axes between the front and rear brackets, front and rear yokes mounted to pivot on longitudinal axes on the respective blocks, front and rear radius bars fixed to the respective front and rear yokes and diverging therefrom and whose outer ends are immovably secured to the corresponding front and rear axles.

WILLIAM C. NABORS.

REFERENCES CITED

The following references are of record in the file of this patent:

UNITED STATES PATENTS

| Number | Name | Date |
|---|---|---|
| 2,108,323 | Weiss | Feb. 15, 1938 |
| 2,239,286 | Freitag | Apr. 22, 1941 |
| 2,361,166 | Ayers | Oct. 24, 1944 |